United States Patent [19]
Kamimoto et al.

[11] Patent Number: 4,993,481
[45] Date of Patent: Feb. 19, 1991

[54] THERMAL STORAGE UNIT

[75] Inventors: Masayuki Kamimoto; Yoshiyuki Abe; Yoshio Takahashi; Ryuji Sakamoto; Kotaro Tanaka; Akira Negishi, all of Tsukuba; Hidetoshi Yamauchi, Ogaki; Kiyotaka Tsukada, Ogaki; Yoshimi Ohashi, Ogaki, all of Japan

[73] Assignees: The Agency of Industrial Science and Technology, Tokyo; Ibiden Co., Ltd., Ogaki, both of Japan

[21] Appl. No.: 412,837

[22] Filed: Sep. 26, 1989

[30] Foreign Application Priority Data

Oct. 3, 1988 [JP] Japan .................. 63-247385

[51] Int. Cl.⁵ ............................................. F28D 20/00
[52] U.S. Cl. ........................................ 165/10; 165/41; 126/436
[58] Field of Search ............... 165/10, 41; 126/436

[56] References Cited
U.S. PATENT DOCUMENTS

| | | | |
|---|---|---|---|
| 3,604,504 | 9/1971 | Kessler, Jr. ............... | 165/104.26 |
| 3,681,843 | 8/1972 | Arcella ..................... | 165/104.26 |
| 3,844,342 | 10/1974 | Eninger ..................... | 165/104.26 |
| 3,901,311 | 8/1975 | Kosson ..................... | 165/104.26 |
| 4,003,426 | 1/1977 | Best et al. ................. | 165/10 |
| 4,018,269 | 4/1977 | Honda ....................... | 165/104.26 |
| 4,194,559 | 3/1980 | Eastman .................... | 165/104.26 |
| 4,221,259 | 9/1980 | Ronc et al. ................ | 165/10 |
| 4,351,388 | 9/1982 | Calhoun .................... | 165/104.26 |
| 4,408,659 | 10/1983 | Hermanns et al. ......... | 165/10 |
| 4,414,961 | 11/1983 | Luebke ..................... | 165/104.26 |
| 4,509,584 | 4/1985 | Michalak et al. ......... | 165/10 |
| 4,512,388 | 4/1985 | Claar et al. ............... | 165/10 |

Primary Examiner—Albert W. Davis, Jr.
Attorney, Agent, or Firm—Frishauf, Holtz, Goodman & Woodward

[57] ABSTRACT

A thermal storage unit has a thermal storage material which performs heat exchange through a fluid filled in a thermal storage body arranged within a vessel having an opening communicated to outside. The thermal storage body is a porous ceramic molding which contains the thermal storage medium.

19 Claims, 8 Drawing Sheets

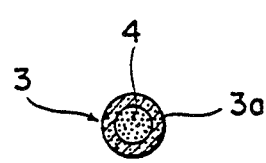
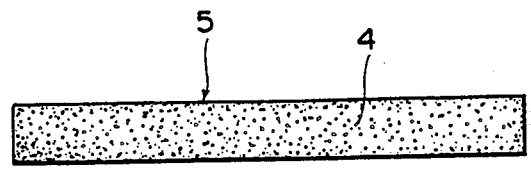
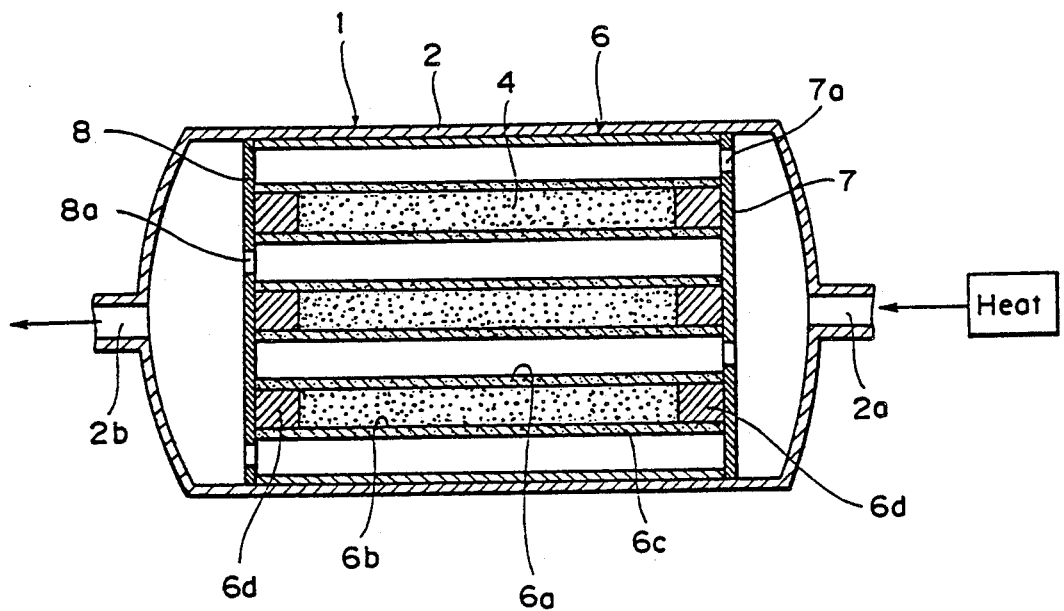

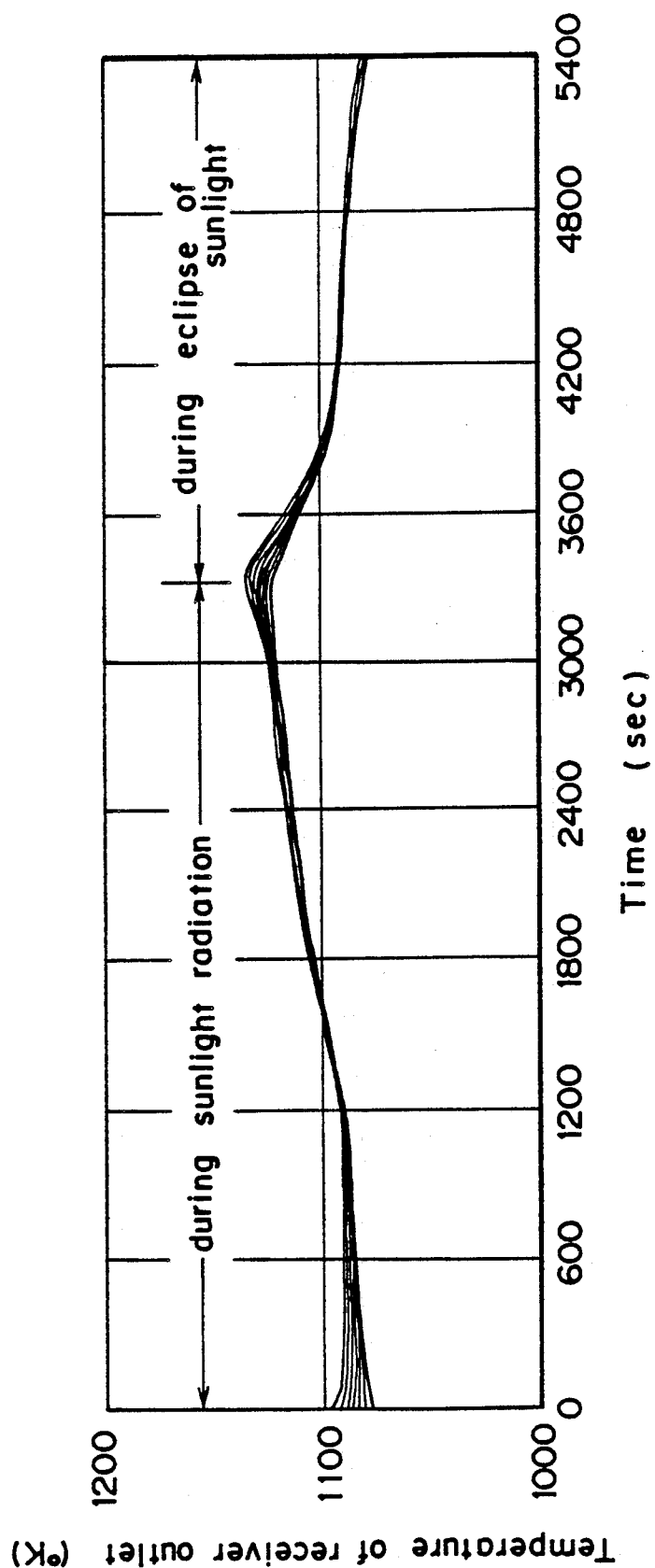

THERMAL STORAGE UNIT

BACKGROUND OF THE INVENTION

This invention relates to a thermal storage unit which can recover, store and take out as desired heat energy including natural energy such as solar energy, terrestrial heat, etc., and artificial energy such as waste heat industrially generated, etc., thereby utilizing effectively said energy.

Energy storage systems may be broadly classified into the sensible heat system in which solar heat, etc. is given to a thermal storage material such as water, sand, etc. to be stored therein and the temperature itself possessed by them is taken out to be utilized, the latent heat system in which melting heat or gasifying heat, etc. accompanied with phase change is utilized and the chemical reaction heat system in which thermal storage is effected by allowing a thermal storage material to undergo a endothermic-exothermic reaction to convert the energy into chemical energy.

Among these energy storage systems, the thermal storage unit employing the latent heat system is higher in storage density and efficiency as compared with the thermal storage units of other systems, and also excellent economically with respect to a simple system, and further excellent in having also in combination the advantage of enabling enhancement of running efficiency of auxiliary equipment, because output and input of heat can be done at a constant temperature, and therefore has been utilized and investigated in various fields such as solar house, solar system for uses in industry, heat generating system and further cosmic heat generation.

Such latent thermal storage unit generally includes the capsule type 9 as shown in FIG. 8, comprising a plurality of capsules 11 arranged within a vessel 10 having an introducing inlet 10a and a discharging outlet 10b for heat medium (fluid) and a thermal storage material 4 filled within said capsule 11, and the shell-tube type 12 as shown in FIG. 9 comprising heat transfer tubes 14 through which fluid passes between the thermal storage materials 4.

Fluid progresses through the introducing inlet and is brought into contact with the thermal storage material through the capsules, etc.

However, according to either heat exchange methods of the capsule type and the shell-tube type, there is involved the problem that the heat exchange capacity is remarkably lowered by heat resistance of the solid phase attached on the heat transfer surface during heat release.

As a means for solving this problem, there has been proposed the method in which heat exchange is effected with good efficiency by direct contact with the heat medium instead of through capsules or heat transfer tubes. This effects direct contact with ethylene glycol as a heat medium by stabilizing the shape of high density polyethylene as a thermal storage material without flowing or sticking to each other even when melted, but it is difficult to stabilize the shape, and also there is the problem that this method is hardly applicable to thermal storage materials for high temperature.

Also, most of organic polymeric substances and inorganic compounds to be used generally for thermal storage materials have large volume changes accompanied with phase change between solid phase and liquid phase. Accordingly, there is also involved the problem that deformation may occur in the vessel such as capsules, etc. holding the thermal storage material, or that cracks may occur in the solid phase, thereby lowering heat exchange capacity.

To cope with such problem, as shown in FIG. 10 and FIG. 11, there has been proposed a device with the thermal storage material being housed in small sections to be scattered with little influence from volume change by providing a plurality of projections 16 or providing partitioning portions 18, etc. as a thermal storage material housing chamber outside of a heat transfer tube 15 or 17, respectively.

However, in this case, the heat transfer tube 15 or 17 and the thermal storage material housing chambers 16 or 18 provided therearound are required to be made of complicated structures, whereby the preparation steps become also complicated to a remarkable economical disadvantage. Further, enlargement of the contact area between the fluid and the thermal storage material is limited, and thus it has been desired to develop a thermal storage unit which can effect further improvement of heat exchange capacity.

Further, in cosmos under minute gravitational force, when employing the capsule type and the shell-tube type of the prior art, the latent thermal storage material becomes apart from the heat transfer surface during melting, whereby there is also a fear that the heat exchange capacity may be extremely lowered. Also, for the thermal storage unit for use in cosmos, weight reduction thereof has been particularly desired.

SUMMARY OF THE INVENTION

An object of the present invention is to overcome the problems as described above and provide a thermal storage unit which is excellent in heat exchange capacity, light in weight and yet has mechanically strong stability to a heat stress and a repeated stress through volume change of a thermal storage material occurring during heat exchange, and also can be prepared with ease.

The thermal storage unit of the present invention comprises a thermal storage material which exchanges heat through contact with a fluid filled in a thermal storage body arranged within a vessel having an opening communicated to the outside, characterized in that said thermal storage body is a porous ceramic molding.

BRIEF DESCRIPTION OF THE DRAWING

FIG. 3 is a lateral sectional view of the capsule type thermal storage unit.

FIG. 4 is a longitudinal sectional view showing a solid porous ceramic molding to be used as the thermal storage body.

FIG. 5 is a longitudinal sectional view showing schematically the thermal storage unit by use of a honeycomb structure as the porous ceramic molding.

FIG. 13 is a graph showing the simulation results of the thermal storage unit obtained in Example 3.

DESCRIPTION OF THE PREFERRED EMBODIMENTS

In the following, the present invention is described in detail by referring to drawing.

Figure 1:
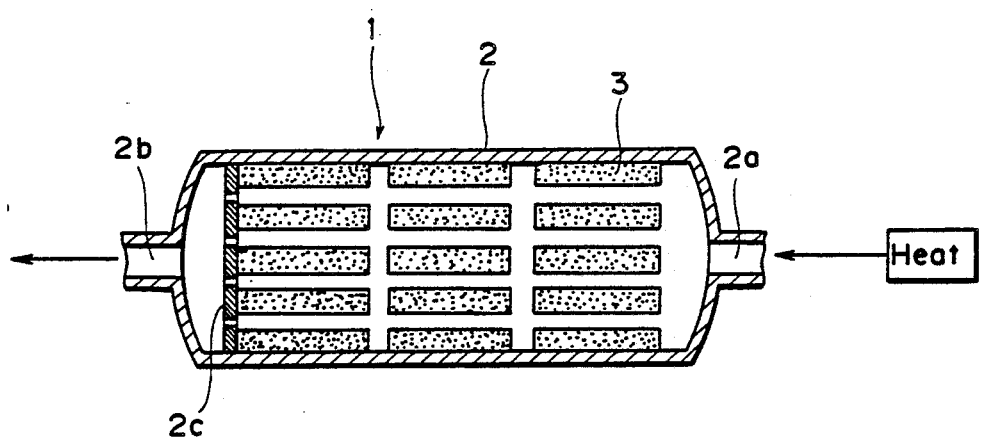
FIG. 1 is a longitudinal sectional view showing schematically a thermal storage unit using the capsule type thermal storage unit as the porous ceramic molding.

FIG. 1 is a longitudinal sectional view showing schematically a thermal storage unit 1 comprising a capsule type thermal storage body 3 as the porous ceramic molding for holding the thermal storage material, a vessel 2 having openings 2a and 2b communicated to outside, and a porous plate 2c for holding the thermal storage bodies 3.

Figure 2:
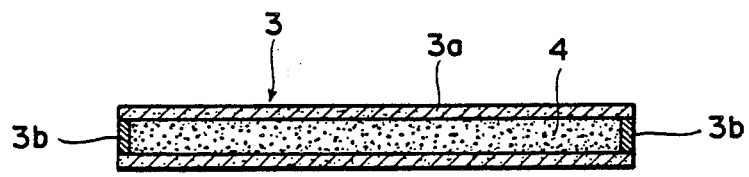
FIG. 2 is a longitudinal sectional view of the capsule type thermal storage unit.

The capsule type thermal storage body 3 is, for example, a cylindrical hollow body as shown in FIG. 2 and FIG. 3, and after filling of the thermal storage material 4 within the porous cylinder 3a, sealing members 3b are secured on both ends thereof.

The thermal storage body 3 can be also constituted by use of flat plates with relatively smaller dimensions in place of the cylinder 3a or those with the same shape as the so-called artificial filling for a packed column, such as Raschich ring, etc., but cylindrical hollow bodies can be advantageously employed, because relatively more thermal storage material 4 can be held therein. Further, as shown in FIG. 1, the above thermal storage bodies 3 may be arranged either with the respective center axes thereof being in parallel to each other or randomly within the vessel 2.

Also, as in the molding 5 shown in a longitudinal sectional view in FIG. 4, a molding comprising a porous ceramic which is not a hollow body as different from the above, namely solid molding, can be also used as the thermal storage body. In this case, the thermal storage material is packed in the pores of the molding 5.

FIG. 5 is a schematic longitudinal sectional view of the thermal storage unit 1 wherein a honeycomb structure body 6 comprises a porous ceramic member as the thermal storage unit.

The honeycomb structure body 6 comprises a number of through-holes 6a and a number of closed hollow holes 6b sealed at both ends by securing of sealing members 6d through thin partitioning walls 6c along the axis direction, and further comprises the thermal storage material 4 filled within said hollow holes 6b before said sealing.

The lateral sectional shape of the holes 6a and 6b of the honeycomb structure body 6 is not particularly limited, but may be circular, triangular, square, or any other shape.

Reference numerals 7 and 8 are porous plates for holding the honeycomb structure body 6, and the porous plate 7 arranged on the fluid introducing inlet 2a side has a fluid introducing hole 7a located at the site corresponding to any desired through-hole 6a of the honeycomb structure body 6, while the porous plate 8 arranged on the fluid discharging outlet 2b side has a fluid discharging outlet 8a located at the side corresponding to a throughhole 6a other than the throughhole 6a corresponding to the introducing hole 7a of the porous plate 7 on the introducing side.

Accordingly, the fluid inflowed through the fluid introducing inlet 2a of the vessel 2 flows into the honeycomb structure body 6 through the fluid introducing hole 7a of the porous plate 7, and after being passed forcibly through the closed hollow hole 6b filled with the thermal storage material 4, flows out through the fluid discharging outlet 2b via the fluid discharging outlet 8a of the porous plate 8.

The porous ceramic molding such as the above capsule type thermal storage body 3 or the honeycomb structure body 6 should be preferably one formed into a desired shape such as cylinder or honeycomb by use of powder composed mainly of at least one selected from aluminum nitride, silicon carbide, silicon, titanium carbide, zirconium boride, titanium boride, boron carbide, boron nitride and carbon as the starting material, according to conventional method such as the extrusion molding method, the sheet molding method, the method of impregnating in an organic sheet, press molding method, etc., followed by sintering. Here, by referring to an example of silicon carbide molding of the present invention, its preparation process is to be described in detail.

The process for preparing the porous silicon carbide molding of the present invention is a process for producing a porous silicon carbide molding having open pores with a three-dimensional network structure, comprising the first step by use of silicon carbide powder as the starting material added with, if necessary, a crystal growth aid to obtain a mixture; the second step of adding a binder for molding to said mixture and molding the mixture into a molding with a desired shape; and the third step of inserting said molding into a heat-resistant vessel and sintering it within a temperature range of 1700° to 2500° C. while shutting out penetration of the outer air, characterized in that, in obtaining the molding in said second step, at least one element selected from aluminum, boron, calcium, chromium, iron, lanthanum, lithium, yttrium, silicon, nitrogen, oxygen and carbon, and compounds thereof (hereinafter sometimes referred to as "transition layer forming aid") is permitted to exist within the molding.

In the above first step, it is preferred to use the β-type silicon carbide powder as the starting material. This is because the β-type silicon carbide crystal has the specific feature of readily forming plate crystals and also is excellent in growth of crystals. Particularly, by use of a starting material of which 60% by weight or more comprises the β-type silicon carbide, the porous body intended by the present invention can be prepared suitably. Among them, it is advantageous to use a starting material containing 70% by weight or more of the β-type silicon carbide.

As the crystal growth aid, for example, aluminum, boron, magnesium, carbon, etc. may be employed.

Next, in the second step, to the mixture obtained in the first step is added a binder for molding such as methyl cellulose, polyvinyl alcohol, water glass, etc., and a molding shaped in a desired shape such as hollow cylinder or honeycomb is obtained according to such method as extrusion molding, sheet molding, press molding, etc.

If the above transition layer forming aid remains in a large amount in the sintered body, the characteristics inherent in silicon carbide will be lost, and therefore its residual amount in the sintered body should be desirably as small as possible, preferably 10 parts by weight or less, above all preferably 5 parts by weight or less, per 100 parts by weight of silicon carbide.

Next, as the third step, the molding obtained is sealed within a heat-resistant vessel and sintered within a temperature range of 1700° to 2500° C. while shutting out penetration of the outer air.

The reason why the molding is sealed within a heat-resistant vessel and sintered while shutting out penetration of the outer air is because the adjacent silicon carbide crystals can be fused together and the growth of plate crystals can be promoted, whereby the plate crystals can be entangled under a complicated state to form a three-dimensional network structure.

Growth of plate crystals can be promoted because evaporation-recondensation of silicon carbide between silicon carbide grains and/or migration through surface diffusion can be considered to be promoted.

As the above heat-resistant vessel, it is preferred to use a heat-resistant vessel comprising at least one of graphite, silicon carbide, tungsten carbide, molybdenum, molybdenum carbide.

Also, the reason why the sintering temperature is made 1700° to 2500° C. is because the growth of grains is insufficient if it is lower than 1700° C. to form a porous body having high strength with difficulty, while if it is higher than 2500° C., sublimation of silicon carbide is accelerated and the plate crystal developed will become contrariwise slender, whereby a porous body having high strength can be obtained with difficulty. A more preferred range may be 1800° to 2300° C.

In the above molding, without forming pores with uniform pore diameter and pore ratio within the molding, gradients may be also created in pore diameter and pore ratio internally of the molding.

For example, as shown in FIG. 4, a solid cylindrical porous body rather than a hollow body is formed, and the pores are formed with the pore diameters and pore ratios becoming smaller stepwise or continuously from the central portion of said porous body toward the outer peripheral portion. Alternatively, in the case of hollow bodies as shown in FIG. 2 and FIG. 3, they may be also formed with the pore diameters and pore ratios becoming smaller stepwise or continuously from the inner surface toward the outer surface of a cylinder 3a. In the case of a honeycomb structure body 6 as shown in FIG. 5, they can be also formed with pore diameters, pore ratios becoming smaller similarly as described above from the thermal storage material side of each partitioning wall 6c toward the outside.

This is because, reduction of the thermal storage material through external dissipation can be made extremely small with increase of the inside thermal storage material when the thermal storage material is used as impregnated in said molding.

For forming such porous molding, in obtaining a molding in the second step of the above preparation process, the above transition layer forming aid is permitted to exist so as to create a concentration gradient in the molding, and open pores of the above network structure are formed so that their average pore diameter may become smaller, for example, from the central portion toward the peripheral portion of the molding stepwise or continuously.

Formation of such pores may be practiced by coating the above molding directly with a solution containing the above compound, or by removing the binder for molding the above molding to make it porous, followed by similar impregnation.

Concentration gradient is created because, of the above substances, aluminum, boron, calcium, chromium, iron, lanthanum, lithium and yttrium have a role of accelerating the rate of silicon carbide crystal grain growth, and extremely many nuclei of plate crystals are formed at the sites where these substances exist and developments of plate crystals occur at the respective portions, whereby the sizes of the plate crystals formed are restricted and three-dimensional network structures with finer textures are formed at the sites where these substances exist in more amounts.

In contrast, silicon, nitrogen, oxygen and carbon have contrariwise a role of retarding the rate of silicon crystal grain growth, and at the sites where these substances exist, nucleus formation of plate crystal is inhibited and the number of plate crystals becomes smaller, whereby the respective plate crystals are grown relatively larger and therefore greater three-dimensional network structure can be formed at the site where these substances exist in more amounts.

Accordingly, for obtaining a molding in which the open pores of the network structure are formed with an average pore diameter becoming smaller stepwise or continuously, for example, from the central portion toward the peripheral portion of the molding, there may be employed the method in which, of the above transition layer forming aids, aluminum, boron, calcium, chromium, iron, lanthanum, lithium or yttrium is contained in the vicinity of the peripheral portion of the molding, followed by sintering according to the method as described above, or the method in which silicon, nitrogen, oxygen or carbon is contained in the vicinity of the central portion of the molding, followed by sintering according to the method as described above, or further the method in which both methods are used in combination.

The sealing members 3b and 6d to be secured at the predetermined ends of the porous ceramic molded product as shown in FIG. 2 and FIG. 3 or FIG. 5 are preferably of the plate sintered body comprising the same material as described above. The securing method may include the adhesion method, the mechanical bonding method by screw, etc., but is not particularly limited.

The sintered body comprising the material as described above has relatively higher mechanical strength even if the pore ratio may be larger, and can stand sufficiently the thermal stress through volume change occurring by phase change of the thermal storage material 4, and yet can effect heat exchange with good efficiency due to high thermal conductivity.

Among them, one comprising at least one of silicon carbide, boron carbide, silicon and carbon as the main component with a mechanical strength of 500 kg/cm$^2$ or higher may be more preferred.

The pore ratio of the above porous ceramic molding is preferably 80 to 30% by volume. If it is larger than 80% by volume, the mechanical strength of the molding becomes smaller, while if it is smaller than 30% by volume, the ratio of the thermal storage material 4 filled in the pores becomes smaller, whereby no efficient heat exchange occurring on the molding surface can be effected. Above all, 55 to 35% by volume is more preferred.

Further, the average pore size is preferably 50 μm or less. This is because the thermal storage material 4 will not be leaked out from pores of the molding when the thermal storage material 4 undergoes phase change to become liquid. Above all, it is more preferably 30 μm or less.

On the other hand, as the thermal storage material 4, it is advantageously at least one selected from LiF, NaF, KF, MgF$_2$, CaF$_2$, LiH and eutectic mixtures containing at least one of these as the component, such as KF—MgF$_2$, NaF—MgF$_2$, NaF—KF—MgF$_2$, CaF$_2$—MgF$_2$, LiF—CaF$_2$, LiF—MgF$_2$, CaF$_2$—MgF$_2$—NaF, LiF—KF—MgF$_2$, NaF—KF, LiF—NaF—MgF$_2$, NaF—KF—MgF$_2$, LiF—LiH, NaF—FeF$_2$, MgF$_2$—BeF$_2$, LiF—NaF, LiF—NaF—CaF$_2$, KCl—LiF—NaF, LiF—NaF—NaCl, LiF—KF, LiF—LiCl, LiF—BeF$_2$, LiF—NaF—KF, LiF—LiCl—LiH, LiF—NaF—KF—MgF$_2$, LiF—LiOH and NaF—BeF$_2$. This is because these compounds have greater latent heat to be excellent in thermal storage efficiency.

Among them, it is more preferred to use at least one selected from LiF, NaF, KF, MgF$_2$, CaF$_2$ and eutectic mixtures containing one of these as the component.

Also, the above compound should be preferably one having excellent adhesion to the porous ceramic molding, and among those as mentioned above, LiF, MgF$_2$ and eutectic mixtures containing at least one of these as the component are particularly preferred.

Further, these thermal storage materials 4 are preferably filled in the pores forming the cylindrical tube 3a of the hollow body or the partitioning wall 6c forming the hollow hole when filled within the hollow body or within hollow holes of the porous ceramic molding shown in FIG. 2 and FIG. 3 or FIG. 5. This is because heat exchange occurring on the molding surface can be made more efficient. Particularly, 40% by volume or more of all the thermal storage material 4 are advantageously filled within the pores.

EXAMPLE 1

To 100 parts by weight of silicon carbide fine powder of a purity of about 98% with an average particle size of 0.25 μm were added 5 parts by weight of methyl cellulose and 35 parts by weight of water, and after thoroughly kneaded, the mixture was subjected to extrusion molding through an extruder having a dice outer diameter of 10 mm and an inner diameter of 8 mm into a hollow cylinder as shown in FIG. 2.

On the other hand, the both end surfaces of the above extruded molding shaped in a hollow cylinder were sealed by use of the above starting materials. Subsequently, the molding was dried, defatted under an oxidative atmosphere and then sintered by holding in a Tanman furnace under argon atmosphere at 1800° C. for 3 hours. The sintered body obtained was porous with a porosity of 45% by volume, an average pore diameter of 2.5 μm, substantially without shrinkage and having a high strength of 18 kg/mm$^2$.

Subsequently, the hollow cylindrical porous sintered body was vacuum impregnated with molten LiF under vacuum of 0.2 Torr.

The hollow cylindrical sintered body which is a thermal storage body obtained was found to be filled with 88% by volume of LiF at the spatial portion internally of the cylinder and at the pore portion of the porous body.

Figure 6:
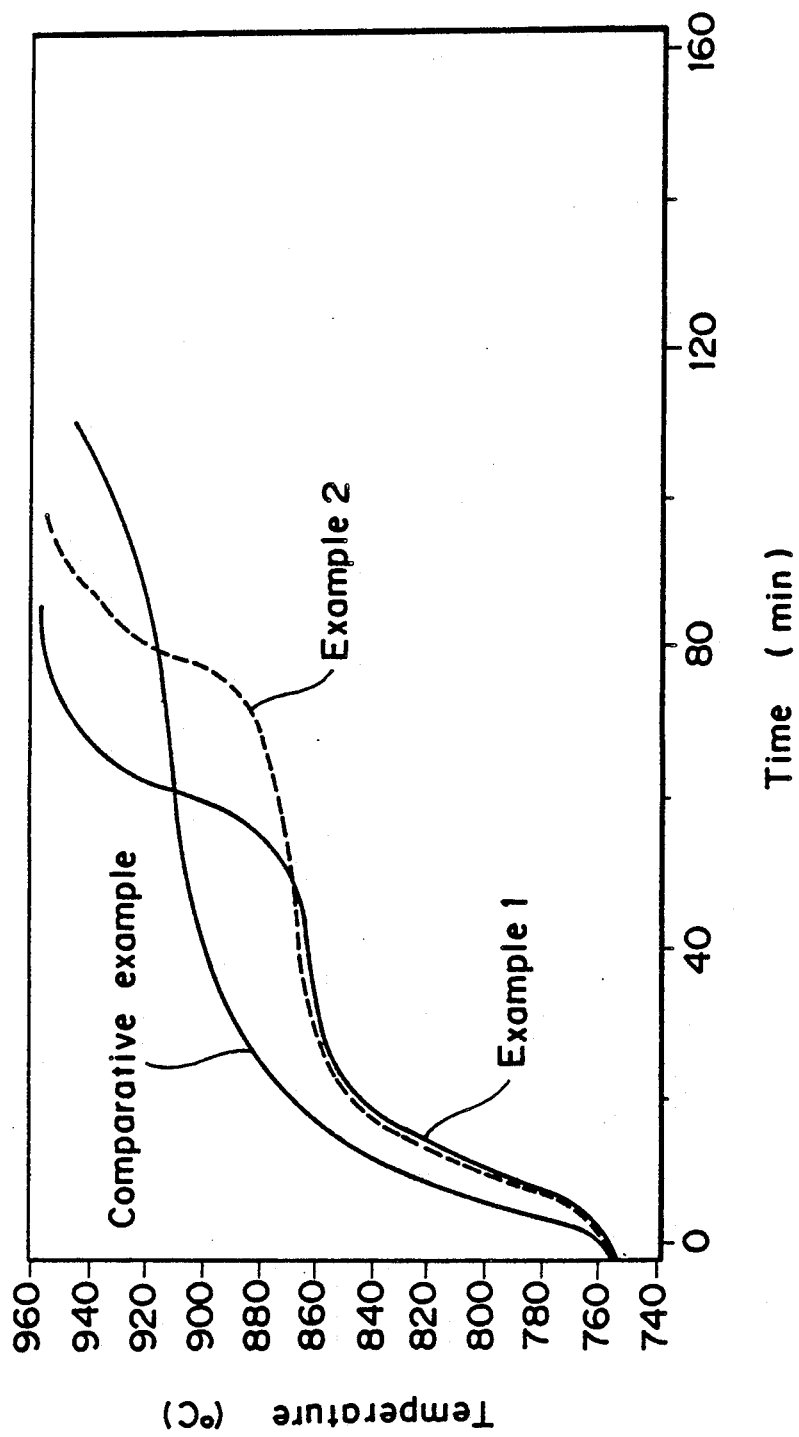
FIG. 6 and FIG. 7 are graphs showing the evaluation results of the thermal storage units obtained in Example and Comparative example.

Next, 15 thermal storage bodies holding the thermal storage material thus obtained were arranged within a vessel of 30 cm in diameter and 1 m in length, and air of a temperature of 945° C. was delivered at 1 m$^3$/min from the inlet side to effect thermal storage, and the change in the discharged air temperature at the outlet was measured. The result is shown in FIG. 6.

Figure 7:
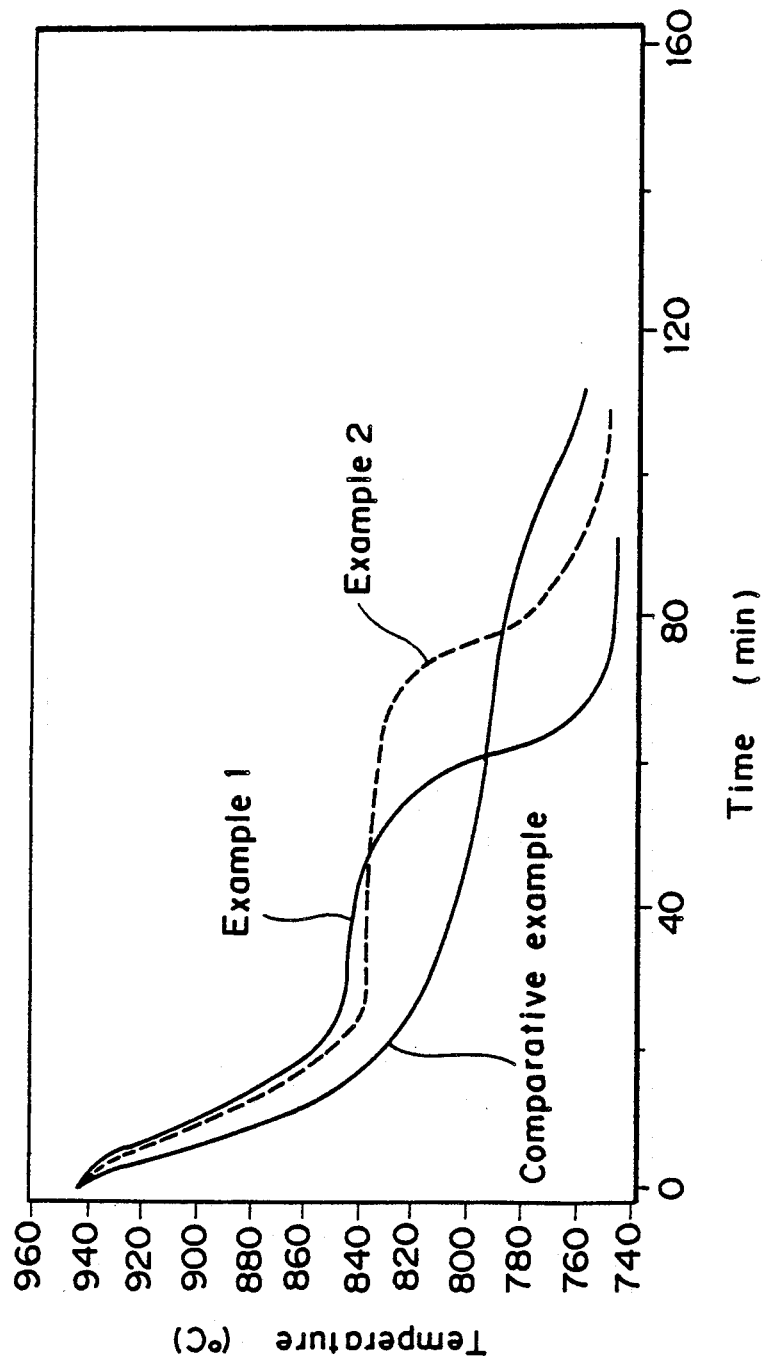
Figure 8:
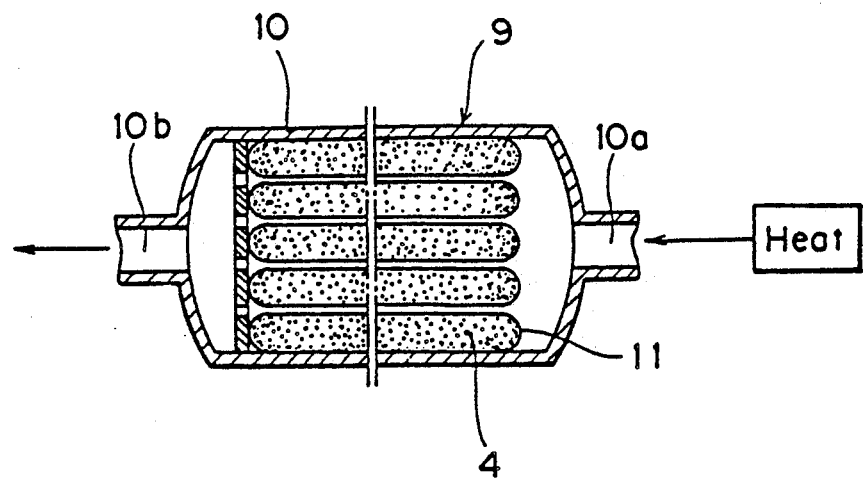
FIG. 8 and FIG. 9 are longitudinal sectional views for illustration of the prior art capsule type thermal storage unit and the prior art shell-tube type thermal storage unit, respectively.
Figure 9:
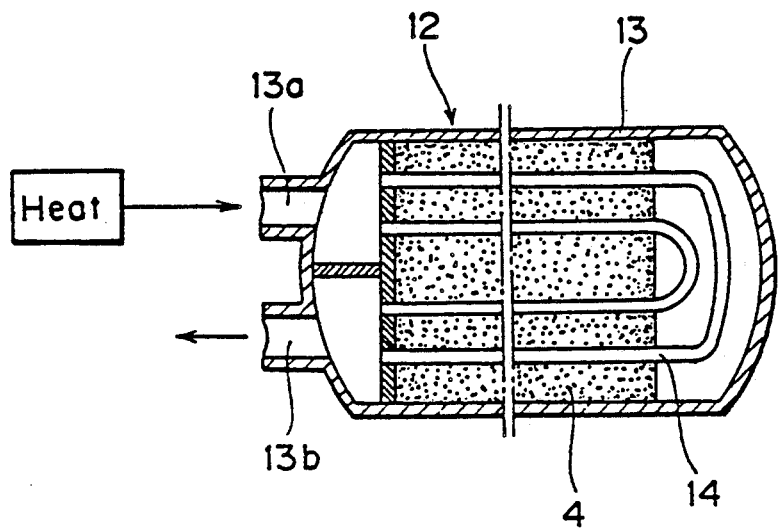
Figure 10:
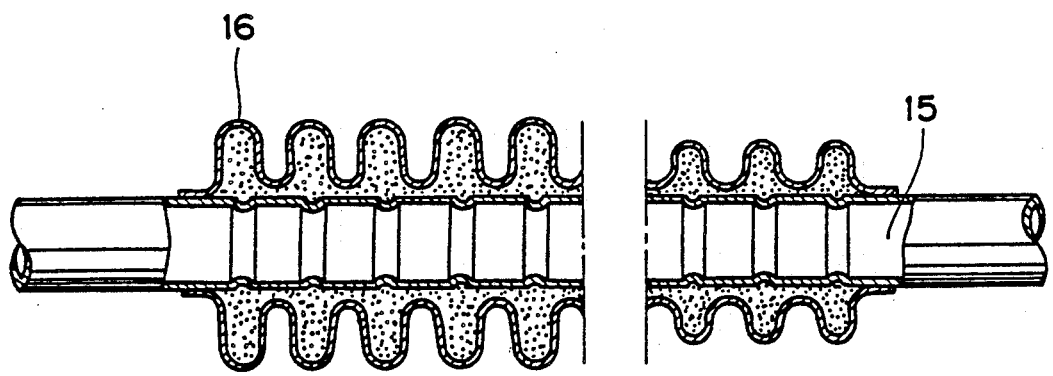
FIG. 10 and FIG. 11 illustrate prior art examples of thermal storage material housing chamber.
Figure 11:
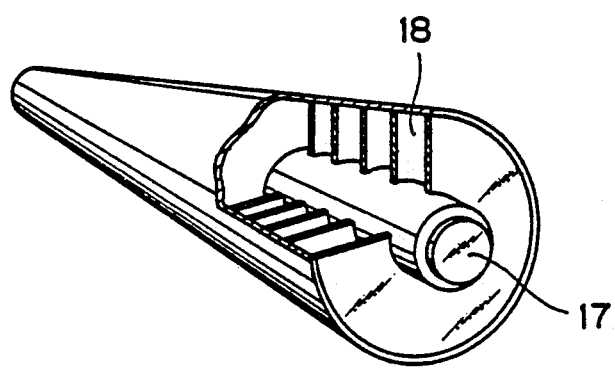

Then, conversely, air of 745° C. was delivered at 1 m$^3$/min. from the outlet side, and the temperature of the discharged air from the inlet side was measured. The result is shown in FIG. 7.

EXAMPLE 2

The fine powder of silicon carbide employed as the starting material was one of which 80% by weight comprised β-type crystals. In the starting material were contained as impurities were contained 0.01 of B, 0.5 of C, 0.01 of Al, 0.2 of N and 0.08 of Fe in atomic weight part, respectively, and traces of other elements, and the total amount of these impurities was 0.81 atomic weight part. The starting material had an average particle size of 0.3 μm and a specific surface area of 18.7 m$^2$/g.

To the starting material were added 10 parts by weight of methyl cellulose as the binder for molding and 20 parts by weight of water. The mixture was kneaded and a solid cylindrical silicon carbide material molding with a diameter of 10 mm and a length of 1.2 m was obtained according to the extrusion molding method.

The molding was heated in an oxidative atmosphere up to 500° C. at a temperature elevation rate of 1° C./min to remove the above organic binder by oxidation. Subsequently, an aqueous solution of BN fine powder (0.2 μm particle) was added at the portion 2 mm from the outer peripheral portion of the molding, followed by drying. As the result, B was found to be contained at 0.1% in the portion 2 mm from the outer peripheral portion, being gradually and continuously reduced toward the inner side, until B was contained at 0.01% in the portion 5 mm from the outer peripheral portion.

Then, the molding was placed in a graphite crucible with a porosity of 20% and sintered in Ar gas atmosphere of 1 atm.

Sinteringation was effected by elevating the temperature at 2° C./min up to 2150° C. and holding the maximum temperature for 4 hours.

The sintered body obtained was porous with a porosity of 40% by volume, an average pore diameter of 2 μm at the outer peripheral portion, and a porosity of 50% by volume, an average pore diameter of 12 μm at the central portion, having a high strength of 9.5 kg/mm$^2$.

Subsequently, the thermal storage material LiF was filled into the pores of the sintered body according to the same method as in Example 1, and 15 cylinders were arranged in parallel within a vessel of 30 cm in diameter and 1 m in length in the same manner as in Example 1, followed by testing according to the same measurement method. The results are shown in FIG. 6 and FIG. 7.

COMPARATIVE EXAMPLE

Into a vessel made of Ni having the same shape as the silicon carbide sintered body of Example 1 was filled the same thermal storage material LiF as used in Example 1. The filling percentage was found to be 95% by volume.

Subsequently, the cylinders were arranged within a vessel similarly as described in Example 1, and the same operations were conducted to measure the temperatures on the inlet side and the outlet side. The results are also similarly shown in FIG. 6 and FIG. 7.

From the above results, as shown in FIG. 6, it can be understood that in the thermal storage unit of Example 1, the outlet temperature of the vessel became 945° C. which was the same as the inlet temperature after about 80 minutes, while being heat stored in the thermal storage body with lapse of time, thus indicating thermal storage in LiF during 80 minutes.

On the other hand, in the case of Comparative example, the outlet temperature of the vessel was 935° C. even after elapse of 110 minutes, indicating the state in which heat was not sufficiently stored, namely during thermal storage, thus indicating lower heat exchange ability as compared with Example 1.

Also, in Example 1, thermal storage is effected better correspondingly than in Comparative example, and the corresponding rate from the initial value of the housing vessel temperature is more rapid. For example, the outlet temperature after elapse of 20 minutes is about 840° C. in Example 1, while about 870° C. in Comparative example. Thus, in Example 1, thermal storage is effected surely with good correspondence.

Further, in Example 1, thermal storage state in latent heat is exhibited from 30 minutes to 50 minutes after high temperature gas flowing, namely during about 20 minutes, indicating that output and input of heat at a constant temperature (about 850° to 860° C.), namely heat exchange at a constant temperature, is possible.

In FIG. 7, similarly as in Example 6, Example 1 is rapid in corresponding rate, and heat is taken out sufficiently from the thermal storage body during about 50 minutes after inflow to be discharged as high temperature fluid, indicating that more heat is absorbed than at the initial time.

Similarly as described above, in Example 1, it is shown that heat exchange through latent heat is effected with good efficiency under the state of a constant temperature of about 850° to 860° C.. Accordingly, if heat cycle (output and input of heat) is performed in this range, it can be effectively used as the latent heat system thermal storage unit.

Also, the above physical properties did not change even after 100 repeated operations, and no leak of molten salt and ceramic breaking was observed.

On the other hand, in Example 2, although similar as in Example 1, the product was made a solid cylinder and therefore the amount of LiF filled was increased, and the heat exchange capacity through latent heat was further increased in the state at a constant temperature of about 850° to 860° C., whereby good results can be obtained.

EXAMPLE 3

Figures 12, 12A:
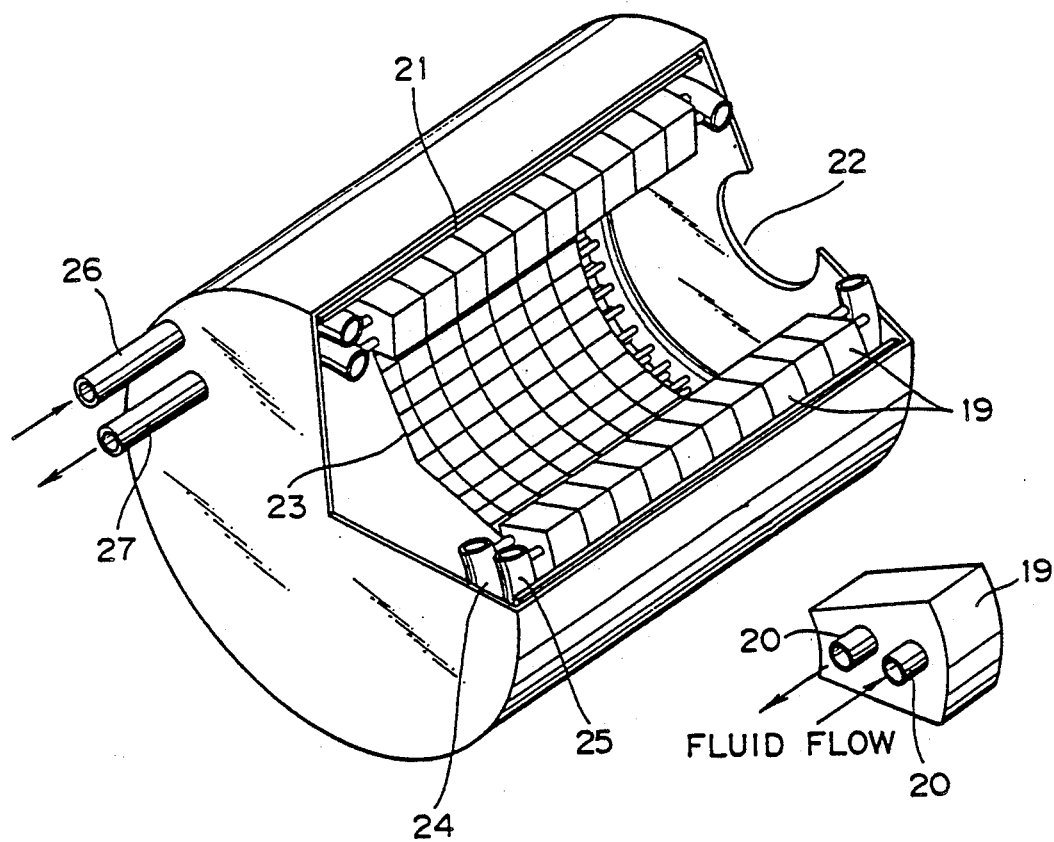
FIG. 12 is a schematic view of a thermal storage unit for generation of electricity by cosmic heat.
FIG. 12A shows an enlarged portion of the storage unit of FIG. 12.

Application of a thermal storage unit for generation of electricity by cosmic heat As a constitutional example of a thermal storage unit for generation of electricity by cosmic heat, an exemplary apparatus is shown in FIG. 12, and an enlarged portion of which is shown in FIG. 12A. This apparatus was arranged many numbers o thermal storage units 19 so as to surround a heat exchanger tube 20. In FIG. 12, 21 is an insulation, 22 is an apperture, 23 is reflectors, 24 is an outlet mainfold, 25 is an inlet mainfold, 26 is a fluid inlet and 27 is a fluid outlet. By this constitution, preparation of the thermal storage unit, and maintenance and control thereof can be carried out easily and improvement in characteristics can be made.

A structure for cosmic at a height of 450 km or so goes around the earth for about 90 minutes. When getting the sunlight, a part of the thermal storage unit is heated by the collected sunlight, and while heating a heat medium, a thermal storage material is fused to conduct thermal storage. At eclipse of sunlight, the heat medium is heated by taking a latent heat from the thermal storage material while solidifying it. Simulation results of an outlet temperature of the heat medium (mixed medium of herium and xenon) when thermal storage and dissipation were repeatedly carried out is shown in FIG. 13. In this simulation, LiF is used as a thermal storage material.

As seen from FIG. 13, it can be understood that substantially constant outlet temperature of the heat medium can be obtained.

EXAMPLE 4

Example of thermal storage system

As an example of a thermal storage system using the thermal storage unit of the present invention, porosity of the ceramic molding is changed to change the ratio of a thermal storage material, or kinds of a molding or a thermal storage material are changed which can be varied depending on the place constituted of the thermal storage system.

As one example, at a portion which is the most easily heated, a thermal storage unit having a high compositional ratio of a thermal storage material, a thermal storage material having high melting point or a molding having high thermal conductivity is used, and at a portion which is hardly heated, a thermal storage unit having a low compositional ratio of a thermal storage material or a thermal storage material having a low melting point is used. By the above consitution, it can be clarified by the result of simulation that effective utilizing ratio of the thermal storage material can be improved.

EXAMPLE 5

Prevention of evaporation of molten salt

When a thermal storage material having a high vapor pressure is used, evaporation of the thermal storage material becomes serious problem particularly when it is used under high vacuum condition such as cosmos. This problem can be solved by covering the surface of a ceramic molding with a dense material.

As a method of covering the surface of the ceramic molding, there may be mentioned a chemical vapor deposition method, a physical vapor deposition method, a sintering method and a flame spraying method.

In case of a thermal storage unit comprising silicon carbide and lithium fluoride, a phase of silicon carbide is formed on a surface of the thermal storage unit by a chemical vapor deposition method with a film thickness of several microns to several ten microns. By this treatment, evaporation of lithium fluoirde can be prevented. Further, a method in which a surface of a porous ceramic is coated with a dense phase apart from a part thereof, and a thermal storage material is impregnated therein from uncoated portion and finally the uncoated portion is coated with a dense material is also effective as prevention of evaporation.

According to the thermal storage unit of the present invention, since a porous ceramic molding having high mechanical strength and high thermal conductivity used as the vessel for holding the thermal storage material, heat exchange capacity is excellent, and also it has sufficient mechanical strength to thermal stress through volume change of the thermal storage material occurring during heat exchange and repeated stress thereof. Also, since the structure of the porous molding is simple, it can be prepared with ease.

Also, since the molten salt can be held within the pores of the porous molding through capillary phenomenon, heat exchange capacity is good also in cosmos under minute gravitational force. Further, since no heat transfer tube is required, the weight can be reduced to great extent as compared with one of the prior art.

What is claimed:

1. A thermal storage unit, comprising:
   a vessel having an opening communicating with the outside for receiving a fluid;
   a thermal storage body arranged within said vessel;
   said thermal storage body comprising:
   a porous ceramic molded body member having opposite ends;
   said porous ceramic molded body m ember having hollow portions and having a thermal storage material received in said hollow portions thereof; and
   sealing means at both opposite ends of said hollow portions of said porous ceramic molded body member for sealing said thermal storage material in said hollow portions of said porous ceramic molded body member; and
   means in said vessel for defining a flow path for said received fluid such that said received fluid flows through said porous ceramic molded body member and through said thermal storage material sealed therein.

2. A thermal storage unit according to claim 1, wherein said porous ceramic molded body member comprises a honeycomb structure having opposite ends, said honeycomb structure comprising:
   a number of through-holes extending axially therethrough;
   said sealed hollow portions comprising a number of closed hollow areas extending axially through said honeycomb structure, said thermal storage material being received in and sealed by said sealing means in said closed hollow areas; and
   partitioning walls arranged spaced apart from each other and extending along the axial direction of said honeycomb structure and defining partitions between said through-holes and said closed hollow areas.

3. A thermal storage unit according to claim 2, wherein said porous ceramic molded body member is a sintered body.

4. A thermal storage unit according to claim 3, wherein said sintered porous ceramic molded body member is sintered at a temperature of from 1700° to 2500° C.

5. A thermal storage unit according to claim 3, wherein said sintered porous ceramic molded body member is sintered at a temperature of from 1800° to 2300° C.

6. A thermal storage unit according to claim 1, wherein said porous ceramic molded body member comprises at least one elongated hollow member.

7. A thermal storage unit according to claim 6, wherein said at least one elongated hollow member comprises at least one elongated cylindrical member.

8. A thermal storage unit according to claim 1, wherein said thermal storage body comprises a plurality of porous ceramic molded body members, each having said sealed hollow portions therein and receiving said thermal storage material in said sealed hollow portions thereof.

9. A thermal storage unit according to claim 1, wherein said porous ceramic molded body member is a sintered body.

10. A thermal storage unit according to claim 9, wherein said sintered porous ceramic molded body member is sintered at a temperature of from 1700° to 2500° C.

11. A thermal storage unit according to claim 9, wherein said sintered porous ceramic molded body member is sintered at a temperature of from 1800° to 2300° C.

12. A thermal storage unit according to claim 1, wherein said porous ceramic molding has a pore ratio of 80 to 30% by volume.

13. A thermal storage unit according to claim 12, wherein said porous ceramic molding has a pore ratio of 55 to 35% by volume.

14. A thermal storage unit according to claim 1, wherein said porous ceramic molding has an average pore size of 50 $\mu$m or less.

15. A thermal storage unit according to claim 14, wherein said porous ceramic molding has an average pore size of 30 $\mu$m or less.

16. A thermal storage unit according to claim 1, wherein said thermal storage material is at least one selected from LiF, NaF, KF, $MgF_2$, $CaF_2$, LiH and mixtures containing at least one of these as the component.

17. A thermal storage unit according to claim 16, wherein said mixture is selected from the group consisting of KF—$MgF_2$, NaF—$MgF_2$, NaF—KF—$MgF_2$, $CaF_2$—$MgF_2$, LiF—$CaF_2$, LiF—$MgF_2$, $CaF_2$—$MgF_2$—NaF, LiF—KF—$MgF_2$, NaF—KF, LiF—NaF—$MgF_2$, NaF—KF—$MgF_2$, LiF—LiH, NaF—$FeF_2$, $MgF_2$—$BeF_2$, LiF—NaF, LiF—NaF—$CaF_2$, KCl—LiF—NaF, LiF—NaF—NaCl, LiF—KF, LiF—LiCl, LiF—$BeF_2$, LiF—NaF—KF, LiF—LiCl—LiH, LiF—NaF—KF—$MgF_2$, LiF—LiOH and NaF—$BeF_2$.

18. A thermal storage unit according to claim 1, wherein said porous ceramic molding comprises the starting material containing at least one selected from aluminum nitride, silicon carbide, silicon, titanium carbide, zirconium boride, titanium boride, boron carbide, boron nitride and carbon.

19. A thermal storage unit according to claim 18, wherein said porous ceramic molding has a mechanical strength of 500 kg/cm$^2$ or higher.

* * * * *